July 7, 1925.

W. B. ROSS 1,545,279

FLASH LIGHT HOLDER

Filed Dec. 26, 1923

2 Sheets-Sheet 1

INVENTOR
WM. B. ROSS
BY C. B. Birkenbuel
ATTORNEY

July 7, 1925.

W. B. ROSS 1,545,279

FLASH LIGHT HOLDER

Filed Dec. 26, 1923  2 Sheets-Sheet 2

INVENTOR
WM B. ROSS
By C.B.Birkenbeuel.
ATTORNEY.

Patented July 7, 1925.

1,545,279

UNITED STATES PATENT OFFICE.

WILLIAM B. ROSS, OF ESTACADA, OREGON.

FLASH-LIGHT HOLDER.

Application filed December 26, 1923. Serial No. 682,603.

*To all whom it may concern:*

Be it hereby known that I, WILLIAM B. Ross, a citizen of the United States, and a resident of Estacada, in the county of Clackamas and State of Oregon, have invented a new and useful Flash-Light Holder, of which the following is a specification.

This invention relates more particularly to flash lights.

The object of my invention is to provide an exceedingly simple and efficient flash light holder which can be used to prevent a flash light from rolling, to incline it at a convenient angle within the limits of the holder, and to so construct same that the holder can be folded back to lie against the rounded surface of the flash light.

Another object is to so construct same that it can be readily attached to a flash light, and that it can be made to fit a number of different diameters of flash light bodies.

I accomplish these results in the manner set forth in the following specification and illustrated in the accompanying drawing, in which:—

Figure 6:
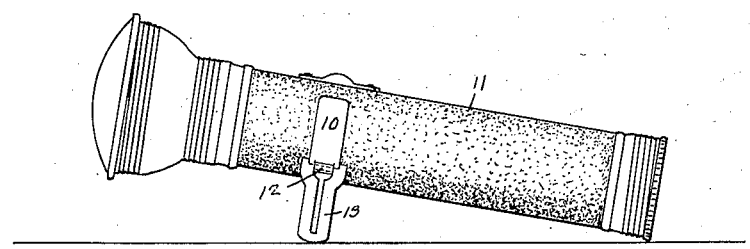
Figure 1:
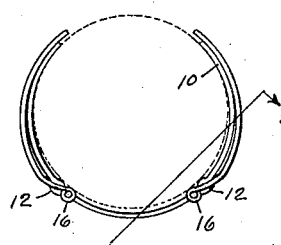
Figure 2:
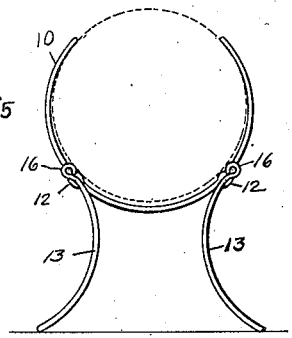
Figure 3:
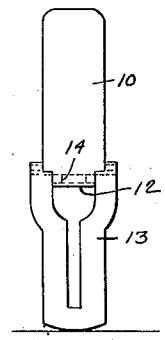
Figure 4:
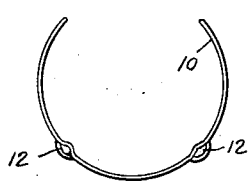
Figure 5:
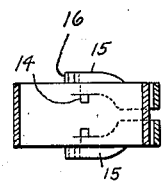
Figure 9:
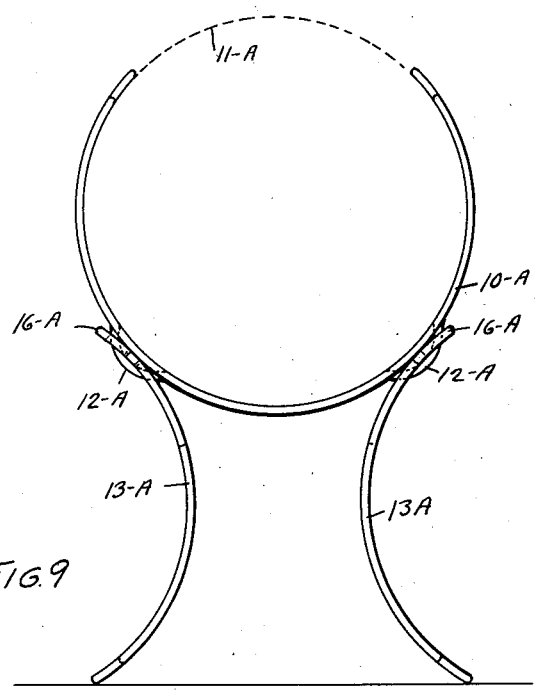
Figure 10:
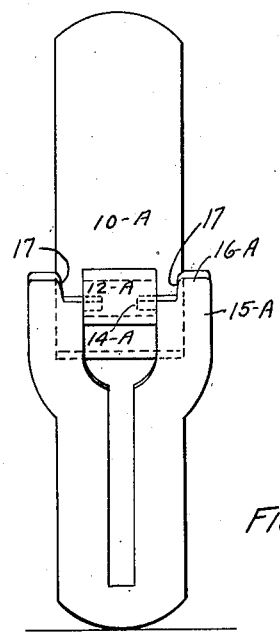
Figure 7:
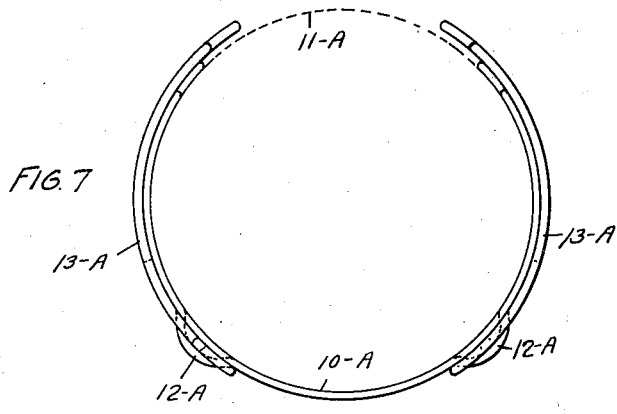
Figure 8:
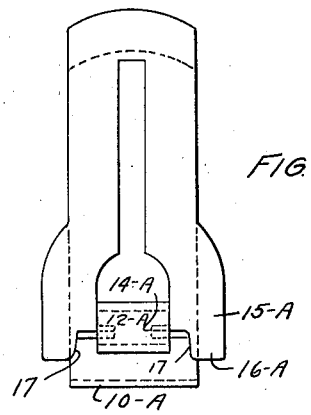

Figure 1 is a front elevation of my device in place on the body of a flash light with its legs folded. Figure 2 is similar to Figure 1, except that the legs are extended. Figure 3 is a side elevation of Figure 2. Figure 4 is a front elevation of the clamp taken by itself. Figure 5 is a section along the line 5—5 in Figure 1. Figure 6 is a side elevation of a flash light having the device attached thereto with the legs extended in a manner to raise the front end of the flash light. Figure 7 is an enlarged front elevation of a modified form of the device in a folded position. Figure 8 is a side elevation of Figure 7. Figure 9 is a view similar to Figure 7 with the legs unfolded. Figure 10 is a side elevation of Figure 9.

Similar numbers of reference refer to the same or similar parts throughout the several views.

Referring in detail to the drawing, I have constructed my device in the form of a spring-shaped clamp 10 adapted to fit closely around the body 11 of a flash light. The clamp 10 has formed on its outer surface two bearings 12 by forcing middle portions of its material outwardly. Forked curved legs 13 are provided with inturned trunnions 14 which can spring into and journal in the bearings 12. The sides 15 of the legs 13 are extended and provided with rounded tips 16 which bear against the flash light body 11 at all times.

Turning now to the modification shown in Figures 7, 8, 9 and 10, it will be observed that the bearings 12$^A$ are outside of the clamp 10$^A$ and that these bearings do not project into the inside of the members 10$^A$, as is the case in the previously described form.

In the form now being described, the legs 13$^A$ conform with the curve of the clamp 10$^A$ throughout their entire length and may be rounded on the extreme tips of their hinged ends, if desired, to prevent marring the flash light 11$^A$.

The members 15$^A$ are provided with inturned trunnions 14$^A$ and the extreme ends 16$^A$ which project past the trunnions 14$^A$ are somewhat closer together than the width of the clamp 10$^A$.

The forked structure of the members 13$^A$ permits the members 16$^A$ to spring apart past the sides of the members 10$^A$ if sufficient force is applied to the legs 13$^A$, and the ends 16$^A$ can latch outside of the clamp 10$^A$ when the legs 13$^A$ reach their extreme position.

This construction makes it preferable to round and slightly angle the inside faces 17 of the member 16$^A$ to prevent complete locking. It will be observed that in this construction the spring in the legs 13$^A$ is utilized to secure the latching action, while in the first described form it is the contact of the ends 16 against the flash light 11 which is dependent upon to hold the legs 13 in the open or closed position.

Owing to the construction of the legs 13 sufficient spring is provided to permit the sides of the legs 13 to be spread apart sufficiently for assembling purposes.

The operation of my device is as follows: The device is placed on a flash light by merely pressing the open end of the member 10 against the body 11, which will open sufficiently to receive the flash light, and then clamp around same. This can also be accomplished by pressing the feet of the legs 13 together, as shown in Figure 2, which will cause the open ends of the member 10 to separate sufficiently to admit the flash light. It is evident that the member 10 can be moved forwardly or backwardly on the flash light, thereby changing its angle of elevation to suit the convenience of the user.

It is easily seen that when the legs 13 are in the position shown in Figures 2, 3 and 6 that the flash light is prevented from rolling, and when it is in the position shown in Figure 1 the flash light can be packed away in the pocket, or other container, without having any objectionable projections.

The purpose of the rounded ends 16, which, as stated, always engage the flash light body 11, is to hold the legs 13 firmly in the extreme folded or extended positions, and to prevent the marring of the case by relatively sharp ends when moving the legs 13.

It will be seen that the member 10 itself acts as a spring for holding the legs 13 in either of their extreme positions, and that additional spring action is obtained by the partial withdrawal of the member 10 from the body 11 when the legs are moved. The open ends of the member 10, engaging the upper side of the flash light 11, tend to seat the flash light against the bottom of the member 10 so that a relatively stiff material may be used for the construction of the clamp 10, since very little spring action is required from same, except when placing it on the flash light, and even this can be done by slipping same over the end instead of springing it over the diameter of the body.

It will be seen that while I have illustrated my device as an attachment for flash lights that its members 13 may also be incorporated in the structure of a flash light, without departing from the spirit of my invention. The entire motive is the provision of a means for inclining and holding a flash light, and this may be accomplished in many ways, as is well known. I therefore do not wish to limit myself to the precise forms illustrated in the drawing, but intend to cover such forms and modifications as fall fairly within the appended claim.

I claim:

A flash light holder comprised of a band clamp adapted to clamp around the body of a flash light, said band having a bearing formed at each side by pressing outwardly the middle portion of the band; a pair of forked legs spaced to receive said bearing, and having trunnions formed on the inner side of the forked ends, said trunnions engaging the ends of said bearings; and tips formed on the forked ends of said legs extending beyond said trunnions, said tips having their inner faces diverging toward their outer ends, said inner faces being somewhat closer together than are the sides of said band clamp.

WILLIAM B. ROSS.